(12) United States Patent
Staats

(10) Patent No.: US 7,653,755 B1
(45) Date of Patent: *Jan. 26, 2010

(54) METHOD AND APPARATUS FOR DETERMINING COMMUNICATION PATHS

(75) Inventor: Erik P. Staats, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/457,924

(22) Filed: Jun. 9, 2003

Related U.S. Application Data

(63) Continuation of application No. 09/432,915, filed on Nov. 2, 1999, now Pat. No. 6,618,750.

(51) Int. Cl.
*G06F 15/173* (2006.01)

(52) U.S. Cl. ....................... 709/253; 709/236

(58) Field of Classification Search ................. 709/209, 709/220, 221, 227, 228, 231, 242, 321, 239, 709/240, 230, 250, 253, 236; 370/349; 711/147; 725/16; 719/321–327; 714/4; 717/168
See application file for complete search history.

(56) References Cited

U.S. PATENT DOCUMENTS

| | | | | |
|---|---|---|---|---|
| 5,175,855 A | * | 12/1992 | Putnam et al. | 719/321 |
| 5,390,301 A | * | 2/1995 | Scherf | 719/321 |
| 5,406,643 A | * | 4/1995 | Burke et al. | 709/243 |
| 5,524,254 A | | 6/1996 | Morgan et al. | 395/800 |
| 5,642,515 A | * | 6/1997 | Jones et al. | 710/220 |
| 5,654,657 A | | 8/1997 | Pearce | 327/163 |
| 5,706,278 A | | 1/1998 | Robillard et al. | 370/222 |
| 5,717,853 A | * | 2/1998 | Deshpande et al. | 709/222 |
| 5,754,765 A | | 5/1998 | Danneels et al. | 395/200.1 |
| 5,764,930 A | | 6/1998 | Staats | 395/287 |
| 5,778,187 A | * | 7/1998 | Monteiro et al. | 709/231 |
| 5,794,009 A | * | 8/1998 | Coleman et al. | 710/15 |
| 5,802,365 A | * | 9/1998 | Kathail et al. | 719/321 |
| 5,809,251 A | * | 9/1998 | May et al. | 709/223 |
| 5,819,115 A | * | 10/1998 | Hoese et al. | 710/68 |
| 5,826,027 A | * | 10/1998 | Pedersen et al. | 709/221 |
| 5,845,152 A | | 12/1998 | Anderson et al. | 395/872 |

(Continued)

FOREIGN PATENT DOCUMENTS

EP 1 085 706 A2 3/2001

(Continued)

OTHER PUBLICATIONS

Roca et al., Demultiplexed Architectures: a Solution for Efficient Streams-Based Communication Stacks, Jul./Aug. 1997, IEEE Network, pp. 16-26.*

(Continued)

*Primary Examiner*—Krisna Lim
(74) *Attorney, Agent, or Firm*—Gazdzinski & Associates, PC

(57) ABSTRACT

Disclosed herein is a system for determining communication paths, especially for AV/C devices. The system includes gathering pertinent information about drivers in each available communication between nodes in the system and ordering the driver information in a communication path list string. The system may be employed with multiple nodes having one or more communication paths between nodes. The system may also be employed with multiple nodes where at least one of the nodes is a bridge.

27 Claims, 3 Drawing Sheets

U.S. PATENT DOCUMENTS

| | | | | |
|---|---|---|---|---|
| 5,923,663 | A | 7/1999 | Bontemps et al. | 370/445 |
| 5,930,480 | A | 7/1999 | Staats | 395/200.74 |
| 5,935,208 | A | 8/1999 | Duckwall et al. | 709/221 |
| 5,940,600 | A | 8/1999 | Staats et al. | 395/287 |
| 5,954,796 | A | 9/1999 | McCarty et al. | 709/222 |
| 5,963,726 | A * | 10/1999 | Rust et al. | 703/13 |
| 5,987,605 | A | 11/1999 | Hill et al. | 713/2 |
| 5,991,842 | A | 11/1999 | Takayama | 710/105 |
| 6,009,480 | A * | 12/1999 | Pleso | 710/8 |
| 6,032,261 | A | 2/2000 | Hulyalkar | 713/400 |
| 6,038,234 | A | 3/2000 | LaFollette et al. | 370/443 |
| 6,038,625 | A * | 3/2000 | Ogino et al. | 710/104 |
| 6,091,726 | A | 7/2000 | Crivellari et al. | 370/392 |
| 6,115,764 | A | 9/2000 | Chisholm et al. | 710/100 |
| 6,145,018 | A | 11/2000 | LaFollette et al. | 710/8 |
| 6,148,346 | A * | 11/2000 | Hanson | 719/321 |
| 6,178,445 | B1 * | 1/2001 | Dawkins et al. | 709/209 |
| 6,192,397 | B1 * | 2/2001 | Thompson | 709/209 |
| 6,199,119 | B1 | 3/2001 | Duckwall et al. | 710/8 |
| 6,202,210 | B1 * | 3/2001 | Ludtke | 725/20 |
| 6,212,171 | B1 | 4/2001 | LaFollette et al. | 370/257 |
| 6,212,633 | B1 | 4/2001 | Levy et al. | 713/153 |
| 6,219,697 | B1 | 4/2001 | Lawande et al. | 709/221 |
| 6,226,716 | B1 * | 5/2001 | Bauman et al. | 711/145 |
| 6,229,538 | B1 * | 5/2001 | McIntyre et al. | 715/734 |
| 6,243,778 | B1 | 6/2001 | Fung et al. | 710/113 |
| 6,247,063 | B1 | 6/2001 | Ichimi et al. | 709/250 |
| 6,275,889 | B1 | 8/2001 | Saito | 710/129 |
| 6,292,840 | B1 * | 9/2001 | Blomfield-Brown et al. | 709/247 |
| 6,314,461 | B2 | 11/2001 | Duckwall et al. | 709/221 |
| 6,343,321 | B2 | 1/2002 | Patki et al. | 709/227 |
| 6,345,315 | B1 | 2/2002 | Mishra | 709/329 |
| 6,347,362 | B1 * | 2/2002 | Schoinas et al. | 711/147 |
| 6,353,868 | B1 | 3/2002 | Takayama et al. | 710/129 |
| 6,356,558 | B1 | 3/2002 | Hauck et al. | 370/450 |
| 6,363,085 | B1 | 3/2002 | Samuels | 370/502 |
| 6,373,821 | B2 | 4/2002 | Staats | 370/252 |
| 6,381,218 | B1 * | 4/2002 | McIntyre et al. | 370/245 |
| 6,385,679 | B1 | 5/2002 | Duckwall et al. | 710/119 |
| 6,405,247 | B1 | 6/2002 | Lawande et al. | 709/221 |
| 6,411,628 | B1 | 6/2002 | Hauck et al. | 370/447 |
| 6,418,150 | B1 | 7/2002 | Staats | 370/503 |
| 6,425,019 | B1 | 7/2002 | Tateyama et al. | 710/11 |
| 6,426,062 | B1 | 7/2002 | Chopra et al. | 424/65 |
| 6,442,630 | B1 | 8/2002 | Takayama et al. | 710/105 |
| 6,446,142 | B1 | 9/2002 | Shima et al. | 710/16 |
| 6,452,975 | B1 | 9/2002 | Hannah | 375/257 |
| 6,457,086 | B1 | 9/2002 | Duckwall | 710/305 |
| 6,466,982 | B1 | 10/2002 | Ruberg | 709/227 |
| 6,496,862 | B1 | 12/2002 | Akatsu et al. | 709/224 |
| 6,519,657 | B1 | 2/2003 | Stone et al. | 710/10 |
| 6,529,522 | B1 | 3/2003 | Ito et al. | 370/466 |
| 6,553,408 | B1 * | 4/2003 | Merrell et al. | 709/213 |
| 6,571,280 | B1 * | 5/2003 | Hubacher | 709/217 |
| 6,587,904 | B1 | 7/2003 | Hauck et al. | 710/107 |
| 6,618,750 | B1 * | 9/2003 | Staats | 709/209 |
| 6,965,911 | B1 * | 11/2005 | Coffman et al. | 709/201 |
| 6,976,080 | B1 * | 12/2005 | Krishnaswamy et al. | 709/230 |
| 6,981,034 | B2 * | 12/2005 | Ding et al. | 709/223 |
| 6,988,274 | B2 * | 1/2006 | Machin et al. | 719/328 |
| 2001/0001151 | A1 | 5/2001 | Duckwall et al. | 710/8 |
| 2001/0019561 | A1 | 9/2001 | Staats | 370/487 |
| 2001/0024423 | A1 | 9/2001 | Duckwall et al. | 370/254 |
| 2002/0055988 | A1 * | 5/2002 | Crooks | 709/220 |
| 2002/0057655 | A1 | 5/2002 | Staats | 370/256 |
| 2002/0085581 | A1 | 7/2002 | Hauck et al. | 370/442 |
| 2002/0101231 | A1 | 8/2002 | Staats | 324/126 |
| 2002/0103947 | A1 | 8/2002 | Duckwall et al. | 710/19 |
| 2002/0188780 | A1 | 12/2002 | Duckwall | 710/105 |
| 2002/0188783 | A1 | 12/2002 | Duckwall et al. | 710/119 |
| 2003/0037161 | A1 | 2/2003 | Duckwall et al. | 709/233 |
| 2003/0055999 | A1 | 3/2003 | Duckwall et al. | 709/236 |

FOREIGN PATENT DOCUMENTS

| | | | |
|---|---|---|---|
| EP | 1 085 706 A3 | 10/2002 | |
| JP | 01173821 A * | 7/1989 | |

OTHER PUBLICATIONS

Raza et al., Network Configuration with Plug-and-Play Components, 1999, IEEE, pp. 937-938.*

Wyss et al., Probabilistic Logic Modeling of Network Reliability for Hybrid Network Architectures, Oct. 1996, Proceedings 21$^{st}$ IEEE, pp. 404-413.*

P1394b IEEE Draft Standard for a High Performance Serial Bus (High Speed Supplement), Institute of Electrical and Electronics Engineers, Inc., pp. 1-408, 2001 (Nov.).

S. Bregni et al., "Jitter Testing Technique and Results at VC-4 Desynchronizer Output of SDH Equipment", *IMTC'94*, pp. 1407-1410, May 10-12, 1994.

S. Bregni et al., "Jitter Testing Technique and Results at VC-4 Desynchronizer Output of SDH Equipment", *IEEE Transactions on Instrumentation and Measurement*, vol. 44, No. 3, pp. 675-678, Jun. 1995.

M. Shiwen et al., "Parallel Positive Justification in SDH C_4 Mapping", *International Conference on Communications*, (ICC'97), Montreal, Quebec, Canada, vol. 3, pp. 1577-1581, Jun. 1997 (no month).

P1394b IEEE Draft Standard for a High Performance Serial Bus (High Speed Supplement), Institute of Electrical and Electronics Engineers, Inc., pp. 1-408, 2001 (Nov.).

* cited by examiner

METHOD AND APPARATUS FOR DETERMINING COMMUNICATION PATHS

CROSS REFERENCE TO RELATED APPLICATIONS

This application is a continuation of U.S. patent application Ser. No. 09/432,915, filed Nov. 2, 1999 now U.S. Pat. No. 6,618,750.

BACKGROUND OF THE INVENTION

1. Field of the Invention

This invention relates to communication path determination techniques. More particularly, this invention relates to methods for determining communication paths between devices where multiple coupling mechanisms are implicated.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbits/second. Most consumer electronic devices available on the market have supported either 100 or 100/200 Mbits/second; meaning that plenty of headroom remains in the 1394 specification. However, as more devices are added to a system, and improvements in the quality of the A/V data (i.e., more pixels and more bits per pixel) emerge, a need for greater bandwidth and connectivity flexibility has been indicated.

The 1394a specification (pending approval) offers efficiency improvements, including support for very low power, arbitration acceleration, fast reset and suspend/resume features. However, not all devices meet the 1394 specification and not all devices communicate by way of the same protocols.

In distributed driver architectures, multiple communication paths may sometimes be available for controlling a remote device. For example, a 1394 and RS-232 serial connection may exist between two nodes implementing a distributed driver architecture. In order to determine the best connection to use, an application has to be able to determine the communication path of each connection.

Old methods of distributed driver architectures (e.g., the Home Audio/Video interoperability, or HAVi, architecture) do not provide any means of ascertaining the communication path used to access a remote device. Only an ID is given for the end device. In the case where two communication paths are available, some implementations may provide two distinct IDs but no means for determining the communication path used for each ID.

BRIEF DESCRIPTION OF THE INVENTION

This invention provides a method for determining the communication paths used to access remote devices. In the case of two nodes connected by two paths and an ID for each path for a remote device, this invention provides a means of ascertaining the communication path associated with each ID.

In one implementation of this invention, each driver in the distributed system provides a device name stack service which returns a string containing an ordered list of the names of the drivers in the driver stack. For most drivers in a driver stack, this service calls the device name stack service for the next driver down the stack and then adds the name of the current driver. This recursive procedure will produce the ordered list of the names of the drivers in the driver stack where the highest layer driver name is first and the lowest layer driver name is last.

In the case of distributed drivers, the device name stack service starts by performing activities within the capabilities of regular local drivers. This first activity produces a list of names of drivers down to the lowest driver used for transmitting messages to the remote node. The resulting string only contains local driver names. It does not provide any information about the remote node. Thus, the second activity of the device name stack service sends a message to the remote node requesting its device name stack service. The receiving driver will have two driver stacks below it, one for the messaging stack and the other for the target device driver stack. The remote driver's device name stack service then calls the device name stack service for its messaging stack and reverses the order of the list of driver names; thus the lowest layer driver name is first and the highest layer, that of the remote driver, is last. Then, the remote driver's device name stack service calls the device name stack service for its target device driver stack and appends the result to the reversed messaging device name stack and returns it to the local node. The local device name stack service appends the remote device name stack to the local device name stack which results in an ordered list of device driver names participating in the communication path between the local node's application and the remote target device.

This same method may be used to produce a list of device classes, device unique IDs, or any other information desired of the communication path. That is, instead of merely identifying the drivers, path specific information may be obtained instead. For instance, instead of ascertaining that the path in question includes a 1394 link, perhaps throughput information would be provided.

This method may also be used in a bridged system where the remote target device resides on a different bus from the local node with an intermediate bridge node. In this manner, a path including the bridge may be ascertained as may be useful in certain applications.

The information provided by the device name stack may be used by a controlling application to determine the best communication path to use when multiple paths are available for the same remote target device. Thus, in the case where both 1394 and RS-232 communication paths are available, the application can determine which device driver ID corresponds to the 1394 path and use that one due to it's higher performance capabilities.

Therefore it is an object of the present invention to determine communication paths is a system of nodes.

It is another object of the present invention to differentiate one of many communication paths amongst a plurality of nodes in a system.

It is yet another object of the present invention to provide the communication paths determined in an ordered string including relevant driver information therein.

Viewed from a first vantage point a method for building a communication path representation is disclosed, comprising in combination, getting driver information for each driver in the path; ordering said driver information sequentially in a list; and presenting said list upon request to requesting applications.

Viewed from a second vantage point a communication path determination system is disclosed, comprising in combination, a plurality of nodes; one or more communication paths coupling said plurality of nodes to each other; and means for defining said communication paths in ordered lists.

Viewed from a third vantage point in a memory space, a method for determining a communication path is disclosed, comprising in combination, starting a local name stack service; gathering information about all local drivers on one or more communication paths; adding said local driver information to one or more ordered lists correlated to each communication path; starting a remote node name stack service; gathering information about all remote node drivers; ordering said remote node driver information in a list; and adding said remote node ordered list to said local node ordered list.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Generally, a recursive method is disclosed for building a communication path string, wherein a plurality of devices may include a plurality of communication paths between each of the plural devices. In particular, where multiple nodes are coupled together via multiple communication paths, this system provides point to point driver data regarding available paths. By providing such available path information, an application, for example, may then use that path information to make a path selection determination. Alternatively, the above mentioned application may present the path data in a user understandable format to a user so that the user may manually select a desired communication path via the application.

Figure 1:
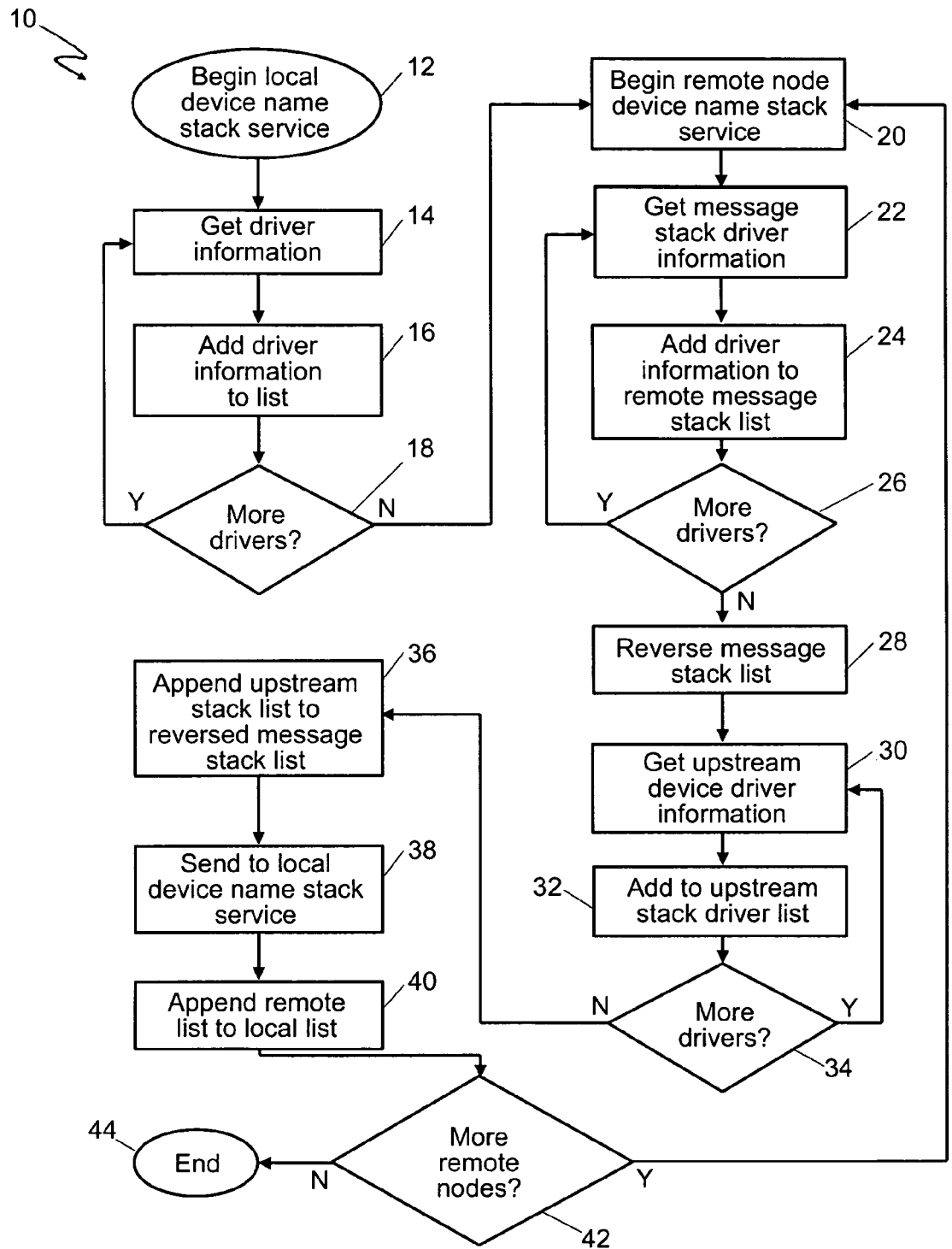
FIG. 1 is flowchart of a method for building a communication path string of the present invention.

Referring now to FIG. 1 a system for building a device communication path string 10 is depicted. This system is initiated by a call or request for communication path data from, for example, an application on a local node to the local device name stack service. As indicated in block 12, a device name stack service is first initiated at a first local driver downstream from the application. The device name stack service is a rudimentary service included with each driver that performs the function of providing its driver information in response to such a call and passing the request along with its added driver information to the next driver downstream. This process is continued until the ultimate or last driver provides its information and then the path information is returned in the form of a string to the requesting application.

That is, once the name stack service is initiated, as in block 12, the driver first in line provides certain self-descriptive information as in block 14. That self-descriptive driver information is then added to a (initially blank) dynamically constructed communication path string. The string will be compiled in such a manner as to provide all obtained self-descriptive driver information from each and every driver in the path in an end to end, driver by driver, list. Once the first driver adds its self-descriptive information to the list, it will then pass the request on to the next local driver until all local drivers have similarly added their self-descriptive information to the string as in blocks 16 and 18.

Thereafter, once all local driver information is gathered, the local device name stack service sends a request to the next remote node. The remote node, then, initiates its device name stack service to collect all of its driver information as in block 20. A remote node will differ from a local node in that the remote node will also include the target device which is intended to receive messages from the local node application. The name stack service on the remote node then will have two stack lists to compile. The first is that side in closer proximity to the local node, or what is called the message stack. The second is that which is in close proximity to the target device, which is called the target device driver stack.

Hence, once initiated as in block 20, the remote node device name stack service gathers its message stack drivers one at a time until all message stack drivers are listed in a string as in blocks 22-26. Then, after all of the message stack drivers are thusly assembled, the stack order is reversed as in block 28. This is done to provide the stack order in an ordered path when viewed from the perspective of the local node. Before reversing the stack, the drivers are ordered with a view from the top of the remote node.

Thereafter, the remote node calls upon the target device drivers for their driver information as in block 30. Again, the drivers are gathered in order from the top of the node as in blocks 32 and 34, which is now in a proper order, at least as viewed from the perspective of the local node. Once all of the target device drivers are so gathered, that stack list is appended to the reversed message stack list as in block 36. Hence, at this point, at least form the perspective of the local node, an ordered list of this remote node's drivers has been compiled in a string.

That string is then sent to the local device name stack service as in block 38. The local device name stack service then appends the remote string list to its previously assembled local driver stack list string as in block 40. This same process is accomplished for each available communication path between the local application and the target device. If no more remote nodes exist, this process is complete and includes an ordered list of all drivers between the application and the target as in block 44. If, on the other hand, there are additional remote nodes between the application and the target device, then, as block 42 indicates, this same process will recurse back to block 20 and gather that remote node's driver information.

Figure 2:
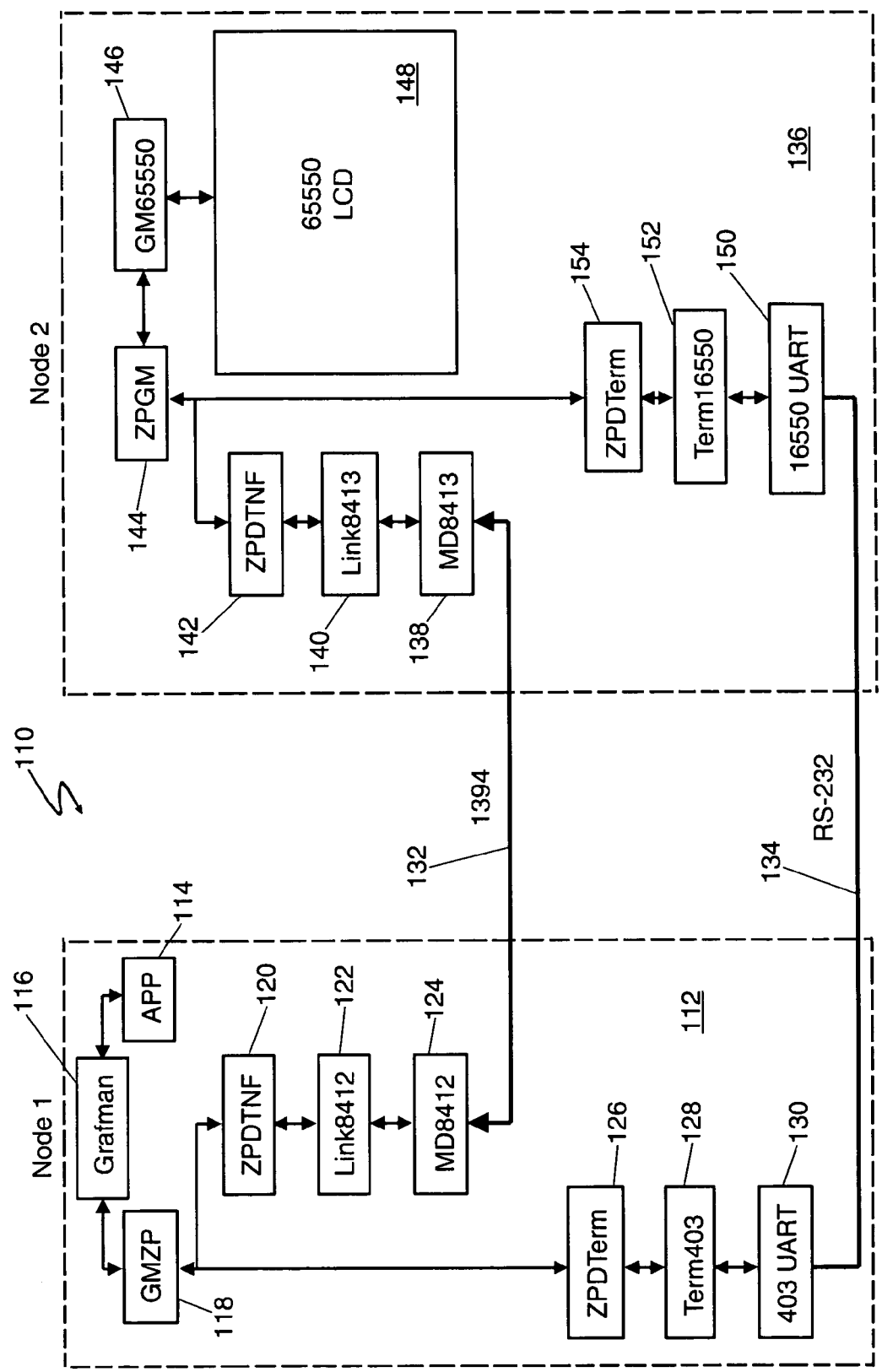
FIG. 2 is a schematic drawing of a first embodiment of the present invention.

In use and operation, and referring now to FIG. 2, an exemplary embodiment 110 is depicted. This embodiment includes a local node 112 (node 1) and a remote node 136 (node 2). The nodes 112 and 136 are coupled to one another via both a 1394 connection 132 and an RS-232 connection 134. Therefore, two available communication paths exist between nodes 1 and 2 which may be utilized by an application 114 on the local node 112 to serve up messages on the target device 148 (an LCD display) on the remote node 136. Hence, it would be desirable for the application 114, or a user thereof, to be privy to information regarding each of the available communication paths so that one or the other or both may be selected for transport of messages from the application 114 to the target device 148.

In this example, then, upon the sending of a communication path request by application 114, the local device name stack service initiates. The local device name stack service preferably resides within an IO coordinator between application 114 and GMZP 118. The local device name stack service is in operative communication with GMZP 118, a local graphics client driver. For reference purposes, grafman 116 is a rudimentary graphics software program which is able to convert linedraw messages from application 114 into appropriate graphics commands that will be understood by an LCD graphics driver, such as the one located on the remote node 136 as GM65550.

Upon receipt of the path request from application 114, then, as shown in FIG. 1, the local device name service begins the dynamic path string building routine. Therefore, as the GMZP driver 118 is first in line from the application 114, certain GMZP self-descriptive information is added to a string, such as its name: "/GMZP". Of course, other information could be included in the string instead, such as, "client_driver", depending on the needs of the system.

Thereafter, two driver stacks are encountered locally. One is related to the 1394 stack and one is related to the RS-232 stack. Each will be addressed individually, though the paths are compiled sequentially. Referring then to the 1394 local stack, the next driver encountered is ZPDTNF 120 (a 1394 transport driver). ZPDTNF 120 is thus added to the path string resulting in: "/GMZP/ZPDTNF". Likewise, the 1394 link driver, Link8412 122, for the physical link MD 8412 124 is added next to the string, resulting in: "/GMZP/ZPDTNF/Link8412". Hence, the local 1394 stack has been built, moving the process to block 20 of FIG. 1.

Hence, the local device name service stack next sends a request to the remote node 136 for its path information. Similarly, on the RS-232 branch, the following is built locally, prior to sending a request to the remote node 136: "/GMZP/ZPDTerm/Term403". Where ZPDTerm 126 is a terminal driver for RS-232 bus communication and Term403 128 is a link driver for the 403 UART physical link 130.

Next, the remote node device name stack service queries its message stack drivers for their information. That is, the message stack includes those drivers on the message transport side of ZPGM 144 (remote node graphics server driver) as opposed to the target device drivers on the target device side of ZPGM 144. Put another way, the message stack includes, in the case of the 1394 communication path, ZPDTNF 142 (a 1394 transport driver), and Link8413 140 (the remote node 136 1394 link driver for the MD8413 physical link 138). Thus, the following remote device name message string is built: "/ZPDTNF/Link8413". Then, as in block 28 of FIG. 1, this message string is reversed to form: "/Link8413/ZPDTNF".

Next, the target device drivers are compiled in order. Therefore, ZPGM 144 adds itself to the target list as: "ZPGM". Then, the LCD65550 display device 148 driver GM65550 146 adds itself to the list in turn forming: "ZPGM/GM65550". This target device driver string is then appended to the remote node message driver string to form: "/Link8413/ZPDTNF/ZPGM/GM65550". Thus forming the remote node device driver communication path in toto. Then, to complete the process for the 1394 communication path, the remote node message driver string is sent to the local node device name stack service to be appended to the local driver string to form: "/GMZP/ZPDTNF/Link8412/Link8413/ZPDTNF/ZPGM/GM65550". This then provides a complete list of drivers, in order, for this 1394 communication path.

Likewise, for the RS-232 path, the remote message driver path will be built as: "/ZPDTerm/Term16550". When reversed it becomes, of course: "/Term16550/ZPDTerm". The target path is the same as that for the 1394 path above, namely: "/ZPGM/GM65550". When added together they form the remote node driver path: "/Term16550/ZPDTerm/ZPGM/GM65550". Thereafter, this remote node driver path is sent to the local node 112 where the local device name service receives same and appends it to the local driver path forming: "/GMZP/ZPDTerm/Term403/Term 16550/ZPDTerm/ZPGM/GM65550".

Thereafter, the local device name service will report both strings back to the requesting application 114. The application 114 or a user thereof may then ascertain additional path information as so provided within the communication path strings.

Figure 3:
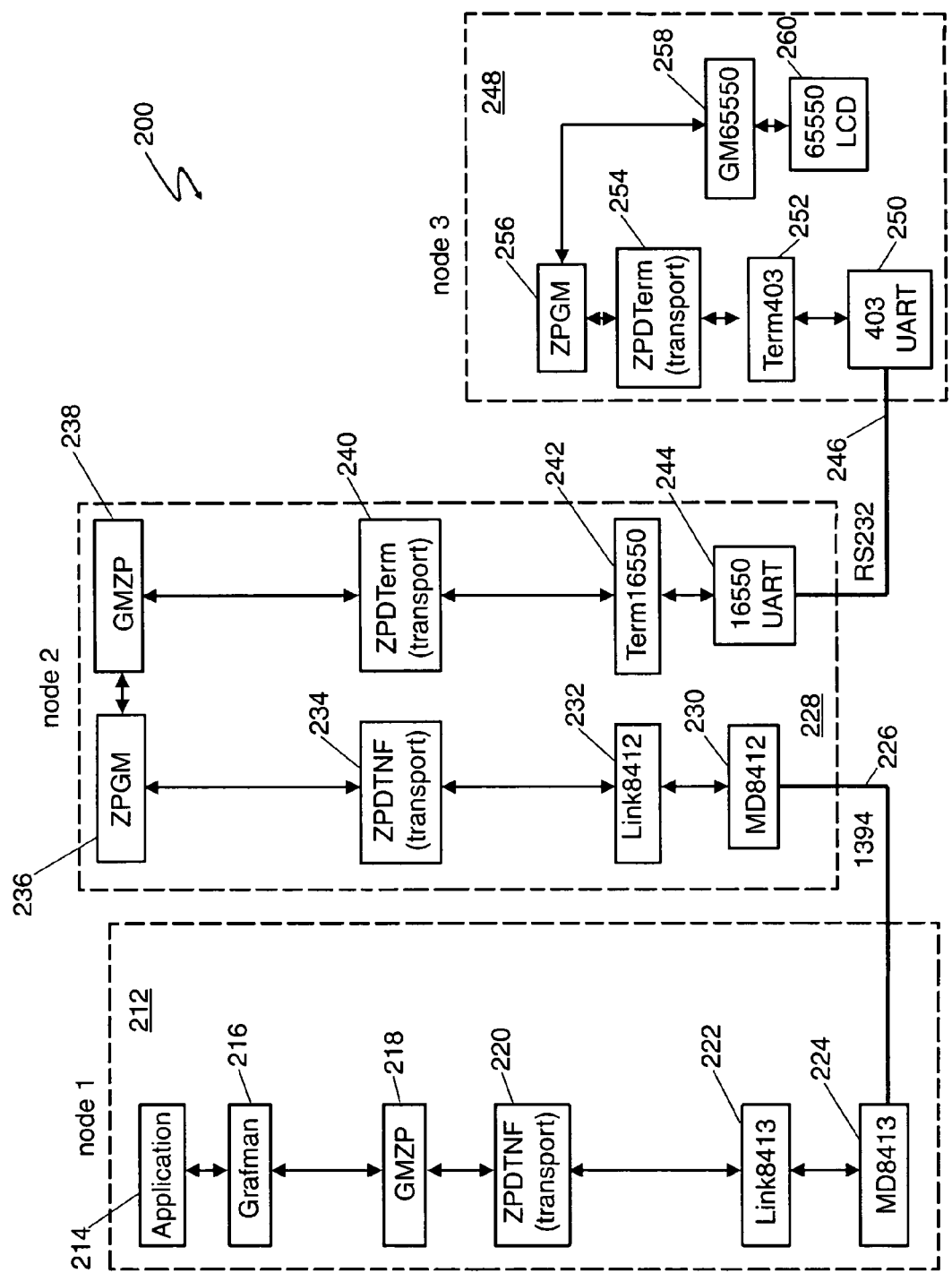
FIG. 3 is a schematic drawing of a second embodiment of the present invention.

Referring now to FIG. 3, wherein like components perform like functions as compared to the FIG. 2 components, a second exemplary embodiment 200 is depicted. This embodiment includes a local node 212 (node 1), a bridge node 228 (node 2), and a remote node 248 (node 3). The local node 212 is operatively coupled to the remote node 248 by means of a 1394 cable 226 and an RS232 cable 246 by way of the bridge node 228. As will be seen, the same general methodology will apply to this embodiment as was applied to the first embodiment.

In this example then, upon the sending of a communication path request by application 214 to the local device name stack services at GMZP 218, "/GMZP" is added to the local path string. Thereafter, the remainder of the local path is constructed by polling the ZPDTNF driver 220 and the link8413 driver 222. The result is a local path string depicted as "/GMZP/ZPDTNF/Link8413".

Thereafter, the GMZP device name stack service sends a message to the bridge node 228 ZPGM 236 (the bridge server driver) to construct its path. ZPGM's path consists of ZPGM and the drivers between ZPGM and node 1. Thus, ZPGM's path is constructed as follows, not unlike the remote message path of FIG. 2. First, the message stack list is constructed as "/ZPDTNF/Link8412". Then, the message path is reversed, resulting in "/Link8412/ZPDTNF". Thereafter, ZPGM appends itself to the string resulting in "/Link8412/ZPDTNF/ZPGM".

Then the bridge node ZPGM 236 passes the request for path information on to the node 2 GMZP client 238 which in turn constructs its local path as "/GMZP/ZPDTerm/Term16550". Bridge node 228 then adds the client string to its bridge string to form "/Link8412/ZPDTNF/ZPGM/GMZP/ZPDTerm/Term16550".

Thereafter, the bridge node 228 GMZP device stack message service sends the request on to the remote node 248 device stack message service at ZPGM 256. The node 3 device stack message service then constructs the message stack path as "/ZPDTerm/Term403" and then reverses it and appends ZPGM to it resulting in "/Term403/ZPDTerm/ZPGM". The ZPGM device stack message service then acquires the upstream or target device path as "GM6550" and appends that to the previously constructed string. The node 3 path thus becomes "/Term403/ZPDTerm/ZPGM/GM65550".

The node 3 device name stack service then sends the node 3 path string back to the node 2 device name message service which appends the node 3 string to the node 2 path string resulting in ""/Link8412/ZPDTNF/ZPGM/GMZP/ZPDTerm/Term16550/Term403/ZPDTerm/ZPGM/GM65550". The node 2 device name service then sends the combined path string to node 1. The node 1 device name message service then appends the node 3+2 path string to the node 1 and node 2 path string combination to obtain: "/GMZP/ZPDTNF/Link8413/Link8412/ZPDTNF/ZPGM/GMZP/ZPDTerm/Term16550/Term403/ZPDTerm ZPGM/GM65550". This communication path string is then reported back to the application 214 fulfilling the application request.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for building a communication path representation between a local node and a remote node in a network comprising a plurality of nodes, said method comprising:
   getting driver information for each driver in a communication path between the local node and the remote node;
   ordering said driver information in a list; said ordering having driver information of a local transport driver before a local link driver and driver information of a remote transport driver after a remote link driver; wherein the list comprises a series of transmission steps between the local node and the remote node; and
   presenting said list to requesting applications.

2. The method of claim 1 wherein the gathering driver information activity includes gathering driver information one node at a time.

3. The method of claim 2 wherein the ordering activity further comprises first ordering said driver information at a node and then adding each said node's driver information to the last node's driver information to form said list.

4. In a memory space, a method for determining a communication path, comprising in combination:
   starting a local name stack service;
   gathering information about all local drivers on one or more communication paths;
   adding, starting from a local device driver for a device at a remote end of said communication path, said local driver information to one or more ordered lists correlated to each communication path;
   starting a remote node name stack service;
   gathering information about all remote node drivers;
   ordering said remote node driver information in a list; and
   adding said remote node ordered list to said local node ordered list.

5. A method for building a communication path representation between a first node and a second node, comprising:
   retrieving a first plurality of drivers associated with the first node;
   ordering, starting from a driver closest to an application, a self-descriptive information string for each of the plurality of drivers in said communication path, thus forming a first ordered plurality of drivers;
   adding the first ordered plurality of drivers to a list;
   retrieving a second plurality of drivers associated with the second node;
   ordering the second plurality of drivers, thus forming a second ordered plurality of drivers; and
   appending the second ordered plurality of drivers to the list.

6. The method of claim 5, wherein the ordering the second plurality of drivers comprises:
   querying a message stack associated with the second node for a plurality of message stack drivers;
   constructing a message stack list from the plurality of message stack drivers;
   permuting the message stack list so as to form a permuted message stack list;
   querying a target device driver stack associated with the second node for a plurality of target device drivers;
   constructing a target device stack list from at least the plurality of target device drivers; and
   appending the target device stack list to the permuted message stack list.

7. A method for building a communication path representation between a first node and a second node, the first node being operatively coupled to the second node by way of a bridge node, said method comprising:
   retrieving a plurality of drivers from the first node;
   ordering self-descriptive information of the plurality of drivers associated with the first node, said ordering beginning from first driver in line from an application; thus forming a first ordered plurality of drivers;
   adding the first ordered plurality of drivers to a list;
   retrieving a plurality of drivers associated with the bridge node;
   ordering the plurality of drivers associated with the bridge node, thus forming a second ordered plurality of drivers;
   appending the second ordered plurality of drivers to the list;
   retrieving a plurality of drivers associated with the second node;
   ordering the plurality of drivers associated with the second node, thus forming a third ordered plurality of drivers; and
   appending the third ordered plurality of drivers to the list.

8. The method of claim 7, wherein the ordering the plurality of drivers present in the bridge node comprises:
   querying a message stack associated with the bridge node for a first plurality of message stack drivers;
   constructing a first message stack list from the first plurality of message stack drivers;
   reversing the first message stack list so as to form a first reversed message stack list;
   retrieving a plurality of drivers from the local path of the bridge node; and
   appending the plurality of drivers from the local path of the bridge node to the first reversed message stack list.

9. The method of claim 8, wherein the ordering the plurality of drivers associated with the second node comprises:
   querying a message stack associated with the second node for a second plurality of message stack drivers;
   constructing a second message stack list from the second plurality of message stack drivers;
   reversing the second message stack list so as to form a second reversed message stack list;
   querying a target device driver stack associated with the second node for a plurality of target device drivers;
   constructing a target device stack list from at least the plurality of target device drivers; and
   appending the target device stack list to the second reversed message stack list.

10. A method for building a communication path representation between a first node and a second node in a network with a plurality of nodes, the method comprising executing a list generation method, the list generation method comprising a current node argument and a list output, wherein the current node argument refers to a node designated as a current node in the network, the first node is initially supplied as the current node argument, and the list generation method comprises:
   retrieving a set of drivers associated with the current node;
   placing the set of drivers in a first list; said placing ordering said set of drivers substantially related to order of protocol stack of the current node; and
   determining if there exists an adjacent node between the current node and the second node and if the adjacent node exists, appending a second list to the first list, the second list generated by recursively calling the list generation method using the adjacent node as the current node argument; said appending resulting in information entries are ordered from viewpoint of said current node.

11. The method of claim 10, wherein if the adjacent node does not exist, the method comprises:
appending a third list to the first list, wherein the third list comprises a set of drivers associated with the second node; and
presenting the list output to requesting applications.

12. The method of claim 10, wherein the adjacent node comprises, in a communication path between the first node and the second node, a node: (i) adjacent to and coupled to the current node, and (ii a node other than the second node.

13. The method of claim 10, wherein the list generation method further comprises ordering the set of drivers associated with the second node.

14. The method of claim 10, wherein the list generation method further comprises ordering the set of drivers associated with the current node.

15. The method of claim 10, wherein said retrieving a set of drivers associated with the current node comprises, when the current node is a node other than the first node:
querying a message stack present in the current node for a set of message stack drivers;
constructing a message stack list from the set of message stack drivers; and
reversing the message stack list so as to form a reversed message stack list; retrieving a set of drivers from the local path of the current node.

16. The method of claim 15, wherein if the reversed stack list has been created, appending the set of drivers from the local path of the current node to the reversed stack list.

17. The method of claim 11, wherein the third list is generated by a third list generation method comprising:
querying a message stack associated with the second node for a set of message stack drivers;
constructing a message stack list from the set of message stack drivers;
inverting the message stack list so as to form an inverted message stack list;
querying a target device driver stack associated with the second node for a set of target device drivers;
constructing a target device stack list from the set of target device drivers; and
appending the target device stack list to the inverted message stack list.

18. A method for building a communication path representation between a first node and a second node in a network with a plurality of nodes comprising:
traversing a path from the first node to the second node, where for each node in said path, the following steps are performed:
retrieving an ordered plurality of information of drivers for that node; and
adding the ordered plurality of information of drivers to a list;
wherein each driver information entry of said ordered plurality of information of drivers is ordered in relation to protocol stack of said that node.

19. The method of claim 18, wherein retrieving an ordered set of drivers comprises, for a node other than the first node:
(1) querying a message stack associated with the node for a plurality of message stack drivers;
(2) constructing a message stack list from the plurality of message stack drivers; and
(3) permuting the message stack list so as to construct a permuted message stack list.

20. The method of claim 18, wherein retrieving an ordered plurality of drivers comprises, for a node other than the second node:
(1) retrieving a plurality of drivers from the local path of the node; and
(2) constructing a local path stack list; and
for the second node:
(1) querying a target device stack associated with the second node for a plurality of target device drivers; and
(2) constructing a target device stack list.

21. The method of claim 19, wherein said adding the ordered plurality of drivers to a list comprises adding the permuted message stack list to said list.

22. The method of claim 20, wherein said adding the ordered plurality of drivers to a list comprises adding the local path stack list to said list; and
adding the target device stack list to said list.

23. A method for building a communication path representation between a first node and a second node in a network comprising a plurality of nodes, said method comprising:
obtaining driver information for each driver in a communication path between the first node and the second node;
ordering said driver information within an information structure, wherein the structure comprises a series of transmission segments between the first node and the second node and wherein said structure includes driver information for at least two link drivers and at least two transport drivers; and
presenting said structure to requesting applications.

24. The method of claim 23 wherein the structure comprises a list, and said act of obtaining driver information activity includes gathering driver information one node at a time.

25. The method of claim 24, wherein the act of ordering further comprises first ordering said driver information at a node, and then adding each said node's driver information to the last node's driver information to form said list.

26. A method for building a description of a communication path between a first node and a second node, comprising:
retrieving a first plurality of drivers associated with the first node;
ordering, according to a predetermined scheme, descriptive information for each of the plurality of drivers in said communication path, thus forming a first ordered plurality of drivers;
adding the first ordered plurality of drivers to a list;
retrieving a second plurality of drivers associated with the second node;
ordering the second plurality of drivers, thus forming a second ordered plurality of drivers; and
appending the second ordered plurality of drivers to the list.

27. A method for providing a description of a communication path between a first node and a second node of a network, said method comprising:
obtaining driver information for each driver in the communication path;
ordering said driver information within an information structure, wherein the structure comprises information relating to a series of transmission segments between the first node and the second node, and information for at least two link drivers and at least two transport drivers; and
presenting said structure to at least one requesting application.

* * * * *